US011942017B2

(12) United States Patent
Jang et al.

(10) Patent No.: US 11,942,017 B2
(45) Date of Patent: Mar. 26, 2024

(54) DISPLAY DEVICE USING A DEMULTIPLEXER HAVING TRANSISTOR CLUSTERS IN PARALLEL

(71) Applicant: Samsung Display Co., LTD., Yongin-si (KR)

(72) Inventors: Jae Yong Jang, Yongin-si (KR); Bon Yong Koo, Yongin-si (KR); Sun Hwa Lee, Yongin-si (KR); Su Jin Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/707,227

(22) Filed: Mar. 29, 2022

(65) Prior Publication Data

US 2022/0351667 A1 Nov. 3, 2022

(30) Foreign Application Priority Data

Apr. 29, 2021 (KR) ........................ 10-2021-0056005

(51) Int. Cl.
*G09G 3/20* (2006.01)
*G09G 5/00* (2006.01)

(52) U.S. Cl.
CPC ... *G09G 3/2092* (2013.01); *G09G 2300/0426* (2013.01); *G09G 2310/0275* (2013.01); *G09G 2310/0297* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 9,053,986 B2 * | 6/2015 | Ahn | H01L 27/1255 | |
| 10,366,643 B2 | 7/2019 | Kwak et al. | | |
| 2003/0064552 A1 * | 4/2003 | Tanaka | G09G 3/3233 | 438/154 |
| 2008/0013393 A1 * | 1/2008 | Robinett | H03K 19/00315 | 365/225.7 |
| 2008/0225061 A1 * | 9/2008 | Kimura | G09G 3/3233 | 345/690 |
| 2010/0148825 A1 * | 6/2010 | Park | H01L 27/1225 | 257/E27.06 |
| 2013/0003269 A1 * | 1/2013 | Kimura | H01L 27/1255 | 361/679.01 |
| 2013/0092963 A1 * | 4/2013 | Kimura | H01L 29/78669 | 257/99 |

(Continued)

FOREIGN PATENT DOCUMENTS

KR 10-2270632 6/2021

*Primary Examiner* — Sepehr Azari
(74) *Attorney, Agent, or Firm* — KILE PARK REED & HOUTTEMAN PLLC

(57) ABSTRACT

A display device includes a display panel including a data driver that converts input data into a data signal and supplies the data signal to an output line, a pixel unit including pixels that display an image based on the data signal, a demultiplexer including transistors electrically connected to the output line in the display panel, and transmitting the data signal from the output line to data lines electrically connected to the pixels, and a timing controller that supplies control signals to control a supply timing of the data signal. A number of the transistors are electrically connected in series, and others of the transistors are electrically connected in parallel.

19 Claims, 14 Drawing Sheets

(56) References Cited

U.S. PATENT DOCUMENTS

| | | | | |
|---|---|---|---|---|
| 2013/0193439 | A1* | 8/2013 | Ahn | H01L 27/1255<br>257/E29.292 |
| 2014/0198135 | A1* | 7/2014 | Eom | G09G 3/3275<br>345/82 |
| 2016/0370621 | A1* | 12/2016 | Huang | H01L 29/78633 |
| 2017/0317189 | A1* | 11/2017 | Tu | H01L 29/78603 |
| 2018/0004052 | A1* | 1/2018 | Tang | G02F 1/134309 |
| 2019/0006395 | A1* | 1/2019 | Wei | H01L 27/1262 |
| 2020/0279869 | A1* | 9/2020 | Al | H01L 27/124 |

* cited by examiner po1: g1, g3, g5
po2: g2, g4, g6
po3: s1, s3, s5
po4: s2, s4, s6
po5: dr1, dr2, dr3, dr4, dr5, dr6

M1: s1, g1, dr1
M2: s2, g2, dr2
M3: s3, g3, dr3
M4: s4, g4, dr4
M5: s5, g5, dr5 M6: s6, g6, dr6 po1: g1, g3, g5
po2: g2, g4, g6
po3: s1, s3, s5
po4: s2, s4, s6
po5: dr1, dr2, dr3, dr4, dr5, dr6

M1: s1, g1, dr1
M2: s2, g2, dr2
M3: s3, g3, dr3
M4: s4, g4, dr4
M5: s5, g5, dr5
M6: s6, g6, dr6 po1: g1, g3
po2: g2, g4, g5, g6
po3: s1, s3
po4: s2, s4, s5, s6
po5: dr1, dr2, dr3, dr4, dr5, dr6

M1: s1, g1, dr1
M2: s2, g2, dr2
M3: s3, g3, dr3
M4: s4, g4, dr4
M5: s5, g5, dr5
M6: s6, g6, dr6 po1: g1, g3
po2: g2, g4, g5, g6
po3: s1, s3
po4: s2, s4, s5, s6
po5: dr1, dr2, dr3, dr4, dr5, dr6

M1: s1, g1, dr1
M2: s2, g2, dr2
M3: s3, g3, dr3
M4: s4, g4, dr4
M5: s5, g5, dr5
M6: s6, g6, dr6

200: 200a, 200b

DISPLAY DEVICE USING A DEMULTIPLEXER HAVING TRANSISTOR CLUSTERS IN PARALLEL

CROSS-REFERENCE TO RELATED APPLICATION(S)

This application claims priority to and benefits of Korean Patent Application No. 10-2021-0056005 under 35 U.S.C. § 119 filed on Apr. 29, 2021 in the Korean Intellectual Property Office, the entire contents of which are incorporated herein by reference.

BACKGROUND

1. Technical Field

The disclosure relates to a display device.

2. Description of the Related Art

In recent years, as interest in information display is increasing, research and development for a display device are continuously being conducted.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An object to be solved by the disclosure is to reduce a dead space (or a bezel) by varying an arrangement of transistors provided or disposed in a demultiplexer.

However, the objects to be achieved by an embodiment are not limited to the objects described above, and other objects may be clearly understood by those of ordinary skill in the art from the description.

According to an embodiment, a display device may include a display panel including a data driver that converts input data into a data signal and supplies the data signal to an output line; a pixel unit including pixels that display an image based on the data signal; a demultiplexer including transistors electrically connected to the output line in the display panel, and transmitting the data signal from the output line to data lines electrically connected to the pixels; and a timing controller that supplies control signals to control a supply timing of the data signal. A number of the transistors are electrically connected in series, and others of the transistors are electrically connected in parallel.

According to an embodiment, the demultiplexer may include a first distributor that outputs the data signal to a first data line in response to a first control signal supplied to a first control line; and a second distributor that outputs the data signal to a second data line in response to a second control signal supplied to a second control line.

According to an embodiment, the first distributor may include a first transistor including a first gate electrode; a second transistor electrically connected to the first transistor in series and including a second gate electrode; a third transistor electrically connected to the first transistor in parallel and including a third gate electrode; and a fourth transistor electrically connected to the third transistor in series, electrically connected to the second transistor in parallel, and including a fourth gate electrode, and the first gate electrode, the second gate electrode, the third gate electrode, and the fourth gate electrode are electrically connected to the first control line.

According to an embodiment, the second transistor may be disposed in a first direction with respect to the first transistor, the third transistor may be disposed in a second direction intersecting the first direction with respect to the first transistor, and the fourth transistor may be disposed in the first direction with respect to the third transistor.

According to an embodiment, the display panel may include an active layer disposed on a base substrate, the active layer including a channel region; a gate insulating layer disposed on the active layer; a first conductive layer disposed on the gate insulating layer; an interlayer insulating layer disposed on the gate insulating layer, the interlayer insulating layer overlapping the first conductive layer; and a second conductive layer disposed on the interlayer insulating layer, with the second conductive layer electrically contacting the active layer through contact holes.

According to an embodiment, the first conductive layer may include a first portion overlapping the active layer, extending in the second direction, and forming the first gate electrode and the third gate electrode; a second portion overlapping the active layer, spaced apart from the first portion, extending in the second direction, and forming the second gate electrode and the fourth gate electrode; and a first connection portion that does not overlap the active layer, and electrically connecting an end of the first portion and an end of the second portion of the first conductive layer.

According to an embodiment of the disclosure, the first conductive layer may further include a second connection portion extending in a direction opposite to the second direction from the first portion and electrically connected to the first control line through a first contact hole.

According to an embodiment, the second conductive layer may include a first electrode portion overlapping the active layer, extending in the second direction, and forming a first electrode of the first transistor and a first electrode of the third transistor; a second electrode portion overlapping the active layer, spaced apart from the first electrode portion, extending in the second direction, and forming a first electrode of the second transistor and a first electrode of the fourth transistor; a third electrode portion disposed between the first electrode portion and the second electrode portion, extending in the second direction, and electrically connected to the first data line through a second contact hole; and a third connection portion electrically connecting an end of the first electrode portion and an end of the second electrode portion.

According to an embodiment, the third electrode portion may form a second electrode of each of the first transistor, the second transistor, the third transistor, and the fourth transistor.

According to an embodiment, the first conductive layer may further include a fourth connection portion electrically connected to the third connection portion through a third contact hole, extending in a direction opposite to the second direction, and electrically connected to the output line through a fourth contact hole.

According to an embodiment, the second conductive layer may form the first control line extending in the first direction and electrically connected to the second connection portion through the first contact hole, and the second conductive layer may form the output line extending in the first direction.

According to an embodiment, the second distributor may include a fifth transistor including a fifth gate electrode; a sixth transistor electrically connected to the fifth transistor in series and including a sixth gate electrode; a seventh transistor electrically connected to the fifth transistor in parallel and including a seventh gate electrode; and an eighth transistor electrically connected to the seventh transistor in series, electrically connected to the sixth transistor in parallel, and including an eighth gate electrode, and the fifth gate electrode, the sixth gate electrode, the seventh gate electrode, and the eight gate electrode are electrically connected to the second control line.

According to an embodiment, the first distributor may further include a fifth transistor electrically connected to the third transistor in parallel and including a fifth gate electrode; and a sixth transistor electrically connected to the fifth transistor in series, electrically connected to the fourth transistor in parallel, and including a sixth gate electrode, and the fifth gate electrode and the sixth gate electrode are electrically connected to the first control line.

According to an embodiment, the sixth transistor may be disposed in a first direction with respect to the fifth transistor, and the fifth transistor may be disposed in a second direction intersecting the first direction with respect to the third transistor.

According to an embodiment, the second transistor may be disposed in a direction opposite to a second direction with respect to the first transistor, the third transistor may be disposed in a first direction intersecting the second direction with respect to the first transistor, the fourth transistor may be disposed in the direction opposite to the second direction with respect to the third transistor, the fifth transistor may be disposed in the first direction with respect to the third transistor, and the sixth transistor may be disposed in the direction opposite to the second direction with respect to the fifth transistor.

According to an embodiment, the first distributor may include a first transistor including a first gate electrode; a second transistor electrically connected to the first transistor in series and including a second gate electrode; a third transistor electrically connected to the first transistor in parallel and including a third gate electrode; a fourth transistor electrically connected to the third transistor in series, electrically connected to the second transistor in parallel, and including a fourth gate electrode; a fifth transistor electrically connected to the fourth transistor in parallel and including a fifth gate electrode; and a sixth transistor electrically connected to the fifth transistor in parallel and including a sixth gate electrode, and the first gate electrode, the second gate electrode, the third gate electrode, the fourth gate electrode, the fifth gate electrode, and the sixth gate electrode are electrically connected to the first control line.

According to an embodiment, the second transistor may be disposed in a direction opposite to a second direction with respect to the first transistor, the third transistor may be disposed in a first direction intersecting the second direction with respect to the first transistor, the fourth transistor may be disposed in the direction opposite to the second direction with respect to the third transistor, the fifth transistor may be disposed in the first direction with respect to the fourth transistor, and the sixth transistor may be disposed in the first direction with respect to the fifth transistor.

According to an embodiment, the display panel may further include a light blocking layer disposed on the base substrate; and a buffer layer overlapping the base substrate and disposed between the base substrate and the active layer.

According to an embodiment, the light blocking layer may overlap the first conductive layer in a region overlapping the active layer.

According to an embodiment, the light blocking layer may overlap the second conductive layer in a region that does not overlap the active layer.

The display device according to the disclosure may include a transistor arrangement structure connected to each other in series/parallel in a demultiplexer. Therefore, a bezel (a non-display area) may be reduced, loss of a data signal may be reduced, and thus image quality may be improved.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
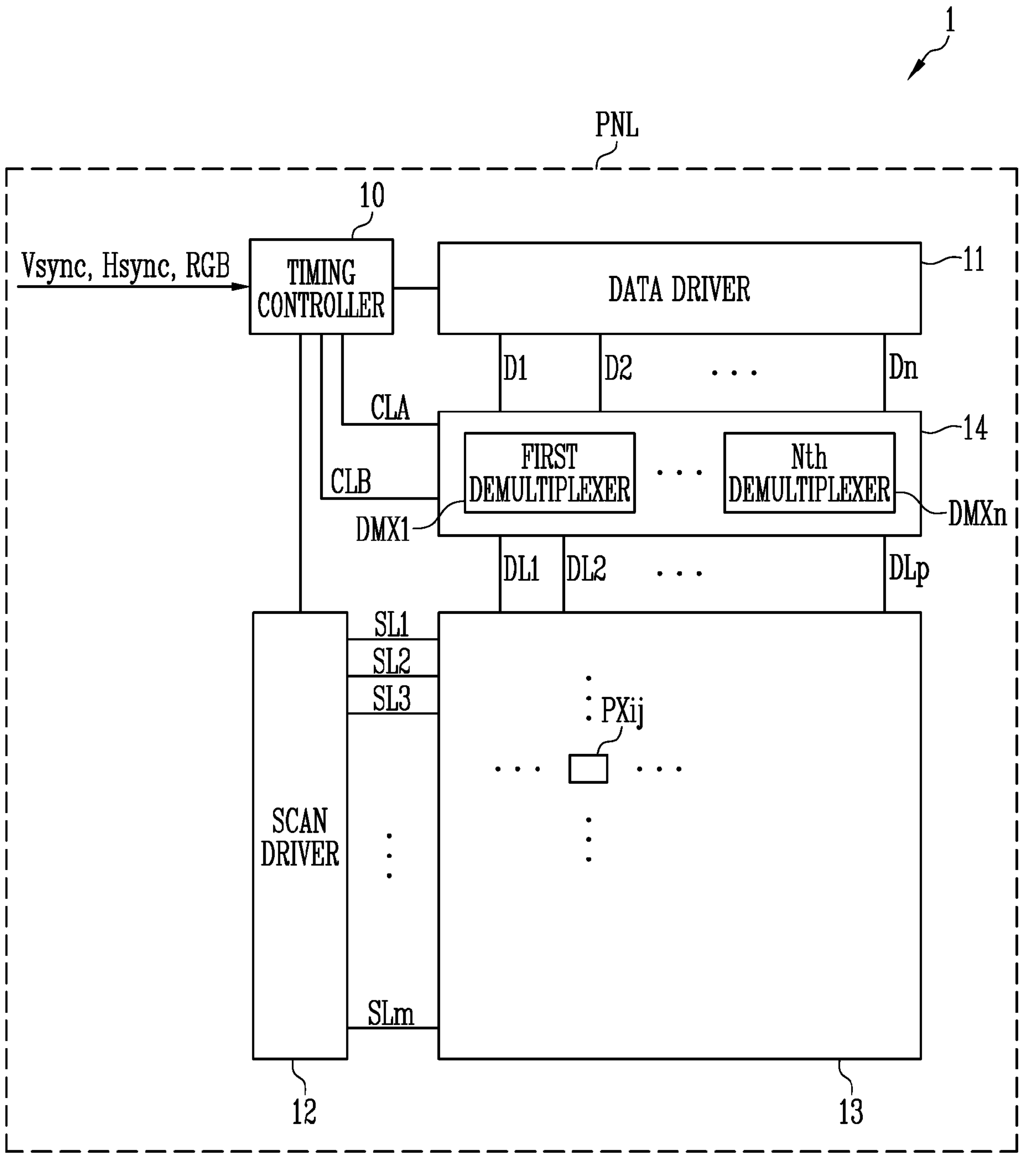
FIG. 1 is a schematic diagram illustrating a display device according to an embodiment.

Hereinafter, embodiments are described in detail with reference to the accompanying drawings. Advantages and features of the embodiments, and a method of achieving them will be apparent with reference to the embodiments described later in detail together with the accompanying drawings. However, the disclosure is not limited to the embodiments disclosed below, but may be implemented in a variety of different forms. The embodiments are intended to complete the disclosure of the disclosure and are provided to completely inform the scope of the disclosure to those of ordinary skill in the art to which embodiments belong, and embodiments may also be defined by the scope of the claims. The same reference numerals refer to the same elements throughout the specification.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification, the singular form also may include the plural form unless specifically stated in the phrase.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Hereinafter, a display device according to an embodiment of the disclosure is described with reference to FIG. 1.

FIG. 1 is a schematic diagram illustrating a display device according to an embodiment of the disclosure.

Referring to FIG. 1, in an embodiment of the disclosure, the display device 1 may include a display panel PNL including a timing controller 10, a data driver 11, a scan driver 12, a pixel or pixel unit 13, and a demultiplexer block 14.

In an embodiment, the display panel PNL may further include at least some of the timing controller 10, the data driver 11, the scan driver 12, and the demultiplexer block 14.

The timing controller 10 may receive an external input signal from an external processor. The external input signal may include a vertical synchronization signal Vsync, a horizontal synchronization signal Hsync, a data enable signal, RGB data, and the like within the spirit and the scope of the disclosure. The timing controller 10 may apply a control signal to the demultiplexer block 14 through a first control line CLA and a second control line CLB to control an output of a data signal to data lines DL1 to DLp.

The vertical synchronization signal Vsync may include pulses, and may indicate that a previous frame period is ended and a current frame period is started based on a time point in case that each of the pulses is generated. In the vertical synchronization signal Vsync, an interval between adjacent pulses may correspond to one frame period. The horizontal synchronization signal Hsync may include pulses, and may indicate that a previous horizontal period is ended and a new horizontal period is started based on a time point in case that each of the pulses is generated. The data enable signal may indicate that the RGB data is supplied in the horizontal period. The RGB data may be supplied in a pixel row or pixel row unit in the horizontal periods in response to the data enable signal. The RGB data corresponding to one frame may be referred to as one input data.

The data driver 11 may convert the input data into data signals and provide data signals (or data voltages) corresponding to grayscales of the input data to pixels. For example, the data driver 11 may sample the grayscales using a clock signal and apply the data signals corresponding to the grayscales to output lines D1 to Dn. At this time, n may be an integer greater than 0.

The scan driver 12 may receive a clock signal, a scan start signal, and the like from the timing controller 10 to generate scan signals to be provided to scan lines SL1 to SLm.

The display panel PNL including the pixel unit 13 may include a pixel PXij. Each pixel PXij may be connected to corresponding data lines DL1 to DLp and scan lines SL1 to SLm. At this time, i and j may be integers greater than 0. For example, p may be an integer greater than n, m may be an integer greater than 0. For example, p may be set to an integer multiple of n.

Although not shown, the display device 1 may further include an emission driver (not shown). The emission driver may receive a clock signal, an emission stop signal, and the like from the timing controller 10 to generate emission signals to be provided to emission lines.

In case that the display device 1 may include the above-described emission driver, each pixel PXij further may include a transistor connected to the emission line. Such a transistor may be turned off during a data write period of each pixel PXij to prevent light emission of the pixel PXij. Hereinafter, it is assumed that the emission driver is not provided.

The demultiplexer block 14 may include n demultiplexers DMX1 to DMXn. In other words, the demultiplexer block 14 may include the same number of demultiplexers DMX1 to DMXn as the output lines D1 to Dn, and the demultiplexers DMX1 to DMXn are connected to any one of the output lines D1 to Dn, respectively. Each of the demultiplexers DMX1 to DMXn is connected to the data lines DL1 to DLp. For example, each of the demultiplexers DMX1 to DMXn may be connected to two data lines. Such demultiplexers DMX1 to DMXn may supply the data signals to p data lines DL1 to DLp.

In case that each data signal supplied to the output lines D1 to Dn is supplied to the p data lines DL1 to DLp as described above, the number of output lines D1 to Dn included in the data driver 11 may be reduced. The number of data integrated circuits included in the data driver 11 may be reduced. A manufacturing cost may be reduced by supplying the data signals supplied to output lines D1 to Dn to the p data lines DL1 to DLp using the demultiplexers DMX1 to DMXn.

Figure 2:
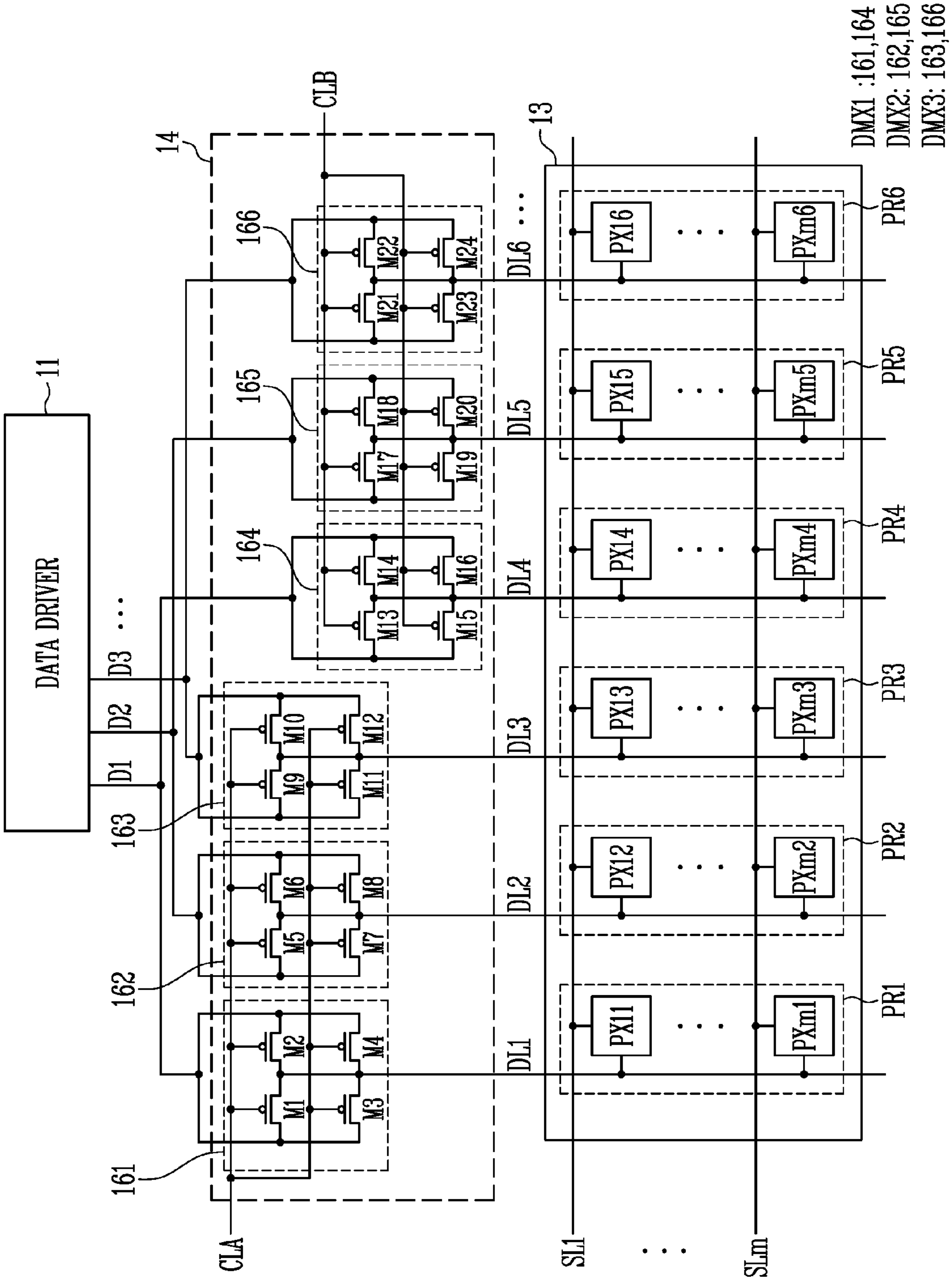
FIG. 2 is a schematic diagram illustrating an example of a demultiplexer provided in the display device of FIG. 1.

FIG. 2 is a schematic diagram illustrating an example of the demultiplexer provided in the display device of FIG. 1.

Referring to FIG. 2, each of the demultiplexers DMX1 to DMXn according to a first embodiment of the disclosure may include distribution units or distributors. Each of the distribution units may include transistors.

In an embodiment, the first demultiplexer DMX1 may include a first distribution unit 161 and a second distribution unit 164. The second demultiplexer DMX2 may include a third distribution unit 162 and a fourth distribution unit 165. The third demultiplexer DMX3 may include a fifth distribution unit 163 and a sixth distribution unit 166.

Hereinafter, the first distribution unit 161 is described as an example, but a configuration of the second distribution unit 164, the third distribution unit 162, the fourth distribution unit 165, the fifth distribution unit 163, and the sixth distribution unit 166 is substantially the same as or similar to a configuration of the first distribution unit 161, and thus a repetitive description is omitted.

The first distribution unit 161 may output the data signal to the first data line DL1 in response to a first control signal supplied to the first control line CLA. The second distribution unit 164 may output the data signal to the fourth data line DL4 in response to a second control signal supplied to the second control line CLB.

In an embodiment, the first distribution unit 161 may include first to fourth transistors M1, M2, M3, and M4. In an embodiment, the second distribution unit 164 may include thirteenth to sixteenth transistors M13, M14, M15, and M16.

In an embodiment, the third distribution unit 162 may include fifth to eighth transistors M5, M6, M7, and M8. In an embodiment, the fourth distribution unit 165 may include seventeenth to twentieth transistors M17, M18, M19, and M20.

In an embodiment, the fifth distribution unit 163 may include ninth to twelfth transistors M9, M10, M11, and M12. In an embodiment, the sixth distribution unit 166 may include twenty-first to twenty-fourth transistors M21, M22, M23, and M24.

In an embodiment, gate electrodes of the first to fourth transistors M1, M2, M3, and M4 included in the first distribution unit 161 are connected to the first control line CLA, first electrodes (or source electrodes) of the first to fourth transistors M1, M2, M3, and M4 are connected to the first output line D1, and second electrodes (or drain electrodes) of the first to fourth transistors M1, M2, M3, and M4 are connected to the first data line DL1.

Gate electrodes of the thirteenth to sixteenth transistors M13, M14, M15, and M16 included in the second distribution unit 164 are connected to the second control line CLB, first electrodes are connected to the first output line D1, and second electrodes are connected to the fourth data line DL4.

Gate electrodes of the fifth to eighth transistors M5, M6, M7, and M8 included in the third distribution unit 162 are connected to the first control line CLA, first electrodes are connected to the second output line D2, and second electrodes are connected to the second data line DL2.

Gate electrodes of the seventeenth to twentieth transistors M17, M18, M19, and M20 included in the fourth distribution unit 165 are connected to the second control line CLB, first electrodes are connected to the second output line D2, and second electrodes are connected to the fifth data line DL5.

Gate electrodes of the ninth to twelfth transistors M9, M10, M11, and M12 are connected to the first control line CLA, first electrodes are connected to the third output line D3, and second electrodes are connected to the third data line DL3.

Gate electrodes of the twenty-first to twenty-fourth transistors M21, M22, M23, and M24 included in the sixth distribution unit 166 are connected to the second control line CLB, first electrodes are connected to the third output line D3, and second electrodes are connected to the sixth data line DL6.

In an embodiment, only the first demultiplexer DMX1 to the third demultiplexer DMX3 are shown in FIG. 2, but since each of the n demultiplexers DMX1 to DMXn is connected to the output line and the data line identically, a description thereof is omitted.

In an embodiment, the first transistor M1 and the second transistor M2 included in the first distribution unit 161 may be connected in series. The third transistor M3 and the fourth transistor M4 may be connected in series. At this time, the first transistor M1 and the second transistor M2, and the third transistor M3 and the fourth transistor M4 may be connected in parallel to each other.

In an embodiment, the thirteenth transistor M13 and the fourteenth transistor M14 included in the second distribution unit 164 may be connected in series. The fifteenth transistor M15 and the sixteenth transistor M16 may be connected in series. At this time, the thirteenth transistor M13 and the fourteenth transistor M14, and the fifteenth transistor M15 and the sixteenth transistor M16 may be connected in parallel with each other.

A turn-on period of the first to fourth transistors M1, M2, M3, and M4 and a turn-on period of the thirteenth to sixteenth transistors M13, M14, M15, and M16 may not overlap. The timing controller 10 may provide control signals of a turn-on level to the first control line CLA and the second control line CLB so that the first to fourth transistors M1, M2, M3, and M4 and the thirteenth to sixteenth transistors M13, M14, M15, and M16 are alternately turned on.

The pixel unit 13 may include pixels PX11 to PXm1, PX12 to PXm2, . . . , PX16 to PXm6, . . . , arranged or disposed therein. The pixels PX11, PX12, PX13, PX14, PX15, PX16, . . . may be connected to the first scan line SL1. The pixels PX11, PX12, PX13, PX14, PX15, PX16, . . . may be connected to the different data lines DL1, DL2, DL3, DL4, DL5, DL6, . . . , respectively.

The pixels PXm1, PXm2, PXm3, PXm4, PXm5, and PXm6 may be connected to the m-th scan line SLm. The pixels PXm1, PXm2, PXm3, PXm4, PXm5, and PXm6 may be connected to the different data lines DL1, DL2, DL3, DL4, DL5, DL6, . . . , respectively.

A first pixel column PR1 may be connected to the first data line DL1 and may include the pixels PX11, . . . , PXm1. A second pixel column PR2 may be connected to the second data line DL2 and may include the pixels PX12, . . . , PXm2. A third pixel column PR3 may be connected to the third data line DL3 and may include the pixels PX13, . . . , PXm3. A fourth pixel column PR4 may be connected to the fourth data line DL4 and may include the pixels PX14, . . . , PXm4. A fifth pixel column PR5 may be connected to the fifth data line DL5 and may include the pixels PX15, . . . , PXm5. A sixth pixel column PR6 may be connected to the sixth data line DL6 and may include the pixels PX16, . . . , PXm6.

In case that the first control signal is supplied to the first control line CLA, the transistors of the first distribution unit 161, the third distribution unit 162, and the fifth distribution unit 163 may be turned on, and the data signals may be supplied to the first data line DL1, the second data line DL2, and the third data line DL3. At this time, the data signals may be charged in capacitors (not shown) formed in the first data line DL1, the second data line DL2, and the third data line DL3, respectively.

In case that the second control signal is supplied to the second control line CLB, the transistors of the second distribution unit 164, the fourth distribution unit 165, and the sixth distribution unit 166 are turned on, and the data signals are supplied to the fourth data line DL4, the fifth data line DL5, and the sixth data line DL6. The data signals may be charged in capacitors formed in the fourth data line DL4, the fifth data line DL5, and the sixth data line DL6, respectively.

Thereafter, in case that the scan signal may be supplied to a scan line (for example, the first scan line SL1), the data signals charged in the capacitors may be written to the pixels PX11, PX12, PX13, PX14, PX15, PX16, . . . connected to the first scan line SL1, respectively.

Figure 3:
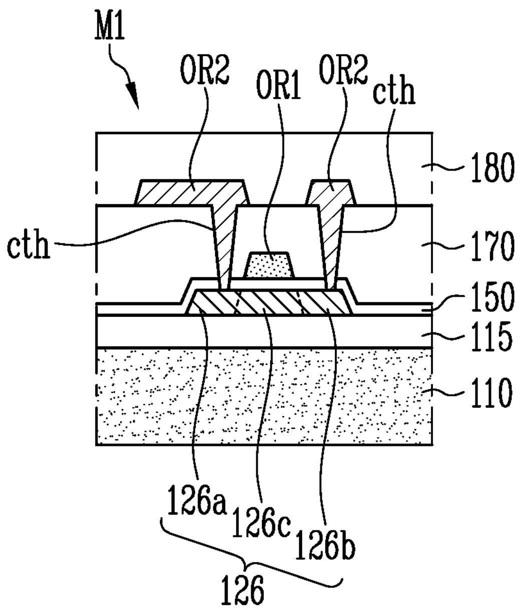
FIG. 3 is a schematic cross-sectional view illustrating an example of a transistor included in the demultiplexer of FIG. 2.

FIG. 3 is a schematic cross-sectional view illustrating an example of the transistor included in the demultiplexer of FIG. 2.

Hereinafter, in FIG. 3, the first transistor M1 is described as an example, but a configuration of the second to twenty-fourth transistors M2, M3, M4, M5, M6, M7, M8, M9, M10, M11, M12, M13, M14, M15, M16, M17, M18, M19, M20, M21, M22, M23, and M24 is substantially the same as the first transistor M1, and thus a repetitive description is omitted. For convenience of description, not all configurations of a substrate of the first transistor M1 are shown in FIG. 3, but only some configurations are shown.

Referring to FIG. 3, the display panel PNL including the first transistor M1 may include a base substrate 110, a buffer layer 115, an active material layer (or active layer) 126, a gate insulating layer 150, a first conductive layer OR1, and a second conductive layer OR2.

The base substrate 110 may be an insulating substrate. The base substrate 110 may be formed of an insulating material of glass, quartz, or a polymer resin. The base substrate 110 may be a rigid substrate, but may be a flexible substrate capable of bending, folding, rolling, or the like within the spirit and the scope of the disclosure.

The buffer layer 115 is disposed on the base substrate 110. At this time, the buffer layer 115 may be disposed to cover or overlap the base substrate 110 entirely. The buffer layer 115 may prevent diffusion of an impurity ion and may perform a surface planarization function. The buffer layer 115 may insulate the active material layer 126 and the base substrate 110 from each other.

A semiconductor layer is disposed on the buffer layer 115. The semiconductor layer may include the active material layers 126 of the transistors including the first transistor M1.

The semiconductor layer may include polycrystalline silicon, single crystal silicon, oxide semiconductor, or the like within the spirit and the scope of the disclosure.

The active material layer 126 may include a first doping region 126*a*, a second doping region 126*b*, and a channel region 126*c*. The channel region 126*c* may be disposed between the first doping region 126*a* and the second doping region 126*b*. The active material layer 126 may include polycrystalline silicon. As another example, the active material layer 126 may include single crystal silicon, low temperature polycrystalline silicon, amorphous silicon, or the like within the spirit and the scope of the disclosure. The first doping region 126*a* and the second doping region 126*b* may be regions in which some regions of the active material layer 126 are doped with an impurity. However, the disclosure is not limited thereto.

However, the active material layer 126 is not limited to that described above. In an embodiment, the active material layer 126 may include an oxide semiconductor. The first doping region 126*a* may be a first conductive region, and the second doping region 126*b* may be a second conductive region. In case that the active material layer 126 may include an oxide semiconductor, the oxide semiconductor may be an oxide semiconductor including indium (In).

In an embodiment, the gate insulating layer 150 is disposed on the semiconductor layer. The gate insulating layer 150 may be disposed to entirely cover or overlap the buffer layer 115 by covering a semiconductor layer.

The first conductive layer OR1 is disposed on the gate insulating layer 150. The first conductive layer OR1 may include a gate electrode overlapping the active material layer 126 on the gate insulating layer 150. The gate electrode may overlap the channel region 126*c* of the active material layer 126.

In an embodiment, the first conductive layer OR1 may be formed of at least one of metals such as gold (Au), silver (Ag), aluminum (Al), molybdenum (Mo), chromium (Cr), titanium (Ti), nickel (Ni), neodymium (Nd), and copper (Cu), or an alloy of metals. The first conductive layer OR1 may be formed as a single layer or multiple layers in which two or more materials may be stacked each other among metals and alloys.

In an embodiment, the interlayer insulating layer 170 is disposed on the first conductive layer OR1. At this time, the interlayer insulating layer 170 may cover or overlap the first conductive layer OR1. The interlayer insulating layer 170 may function as an insulating layer between the first conductive layer OR1 and another layer disposed thereon. The interlayer insulating layer 170 may include an organic insulating material and may perform a surface planarization function.

The second conductive layer OR2 is disposed on the interlayer insulating layer 170. The second conductive layer OR2 may include a source electrode and a drain electrode of the first transistor M1. In an embodiment, the second conductive layer OR2 may be formed of at least one of metals such as gold (Au), silver (Ag), aluminum (Al), molybdenum (Mo), chromium (Cr), titanium (Ti), nickel (Ni), neodymium (Nd), and copper (Cu), or an alloy of metals.

The source electrode and the drain electrode may respectively contact the first doping region 126*a* and the second doping region 126*b* of the active material layer 126 through contact holes cth passing through the interlayer insulating layer 170 and the gate insulating layer 150.

In an embodiment, a protective layer 180 may be disposed on the second conductive layer OR2. The protective layer 180 may cover or overlap the second conductive layer OR2 and may be entirely disposed on the interlayer insulating layer 170. The protective layer 180 may be disposed to cover or overlap the source electrode and the drain electrode.

Figure 4:
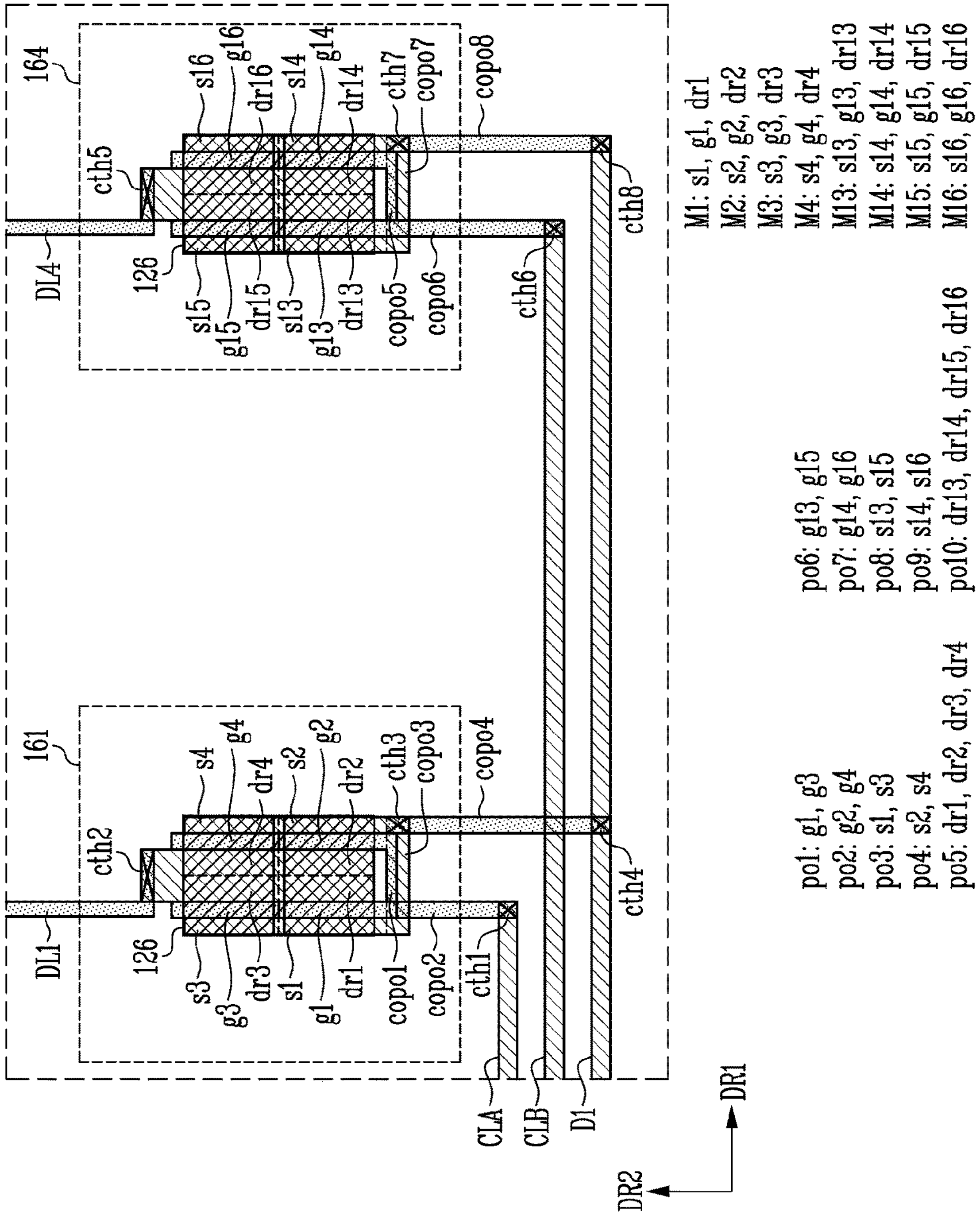
FIG. 4 is a schematic diagram illustrating an example of a layout of the demultiplexer of FIG. 2.

FIG. 4 is a schematic diagram illustrating an example of a layout of the demultiplexer of FIG. 2.

Referring to FIGS. 3 and 4, the first demultiplexer DMX1 may include the first distribution unit 161 and the second distribution unit 164.

In an embodiment, the first distribution unit 161 may include the first to fourth transistors M1, M2, M3, and M4, and the second distribution unit 164 may include the thirteenth to sixteenth transistors M13, M14, M15, and M16.

In an embodiment, the second transistor M2 is disposed in a first direction DR1 with respect to the first transistor M1, and the fourth transistor M4 is disposed in the first direction DR1 with respect to the third transistor M3. The third transistor M3 is disposed in a second direction DR2 with respect to the first transistor M1, and the fourth transistor M4 is disposed in the second direction DR2 with respect to the second transistor M2. At this time, the first direction DR1 and the second direction DR2 may be substantially orthogonal.

In an embodiment, the first conductive layer OR1 may include a first portion po1, a second portion po2, a first connection portion copo1, a second connection portion copo2, and a fourth connection portion copo4.

The first portion po1 may overlap the active material layer 126 and may be provided in a form extending in the second direction DR2. The first portion po1 may include (form) a first gate electrode g1 and a third gate electrode g3.

The second portion po2 may overlap the active material layer 126, may be spaced apart from the first portion po1, and may extend in the second direction DR2. The second portion po2 may include a second gate electrode g2 and a fourth gate electrode g4.

The first connection portion copo1 may not overlap the active material layer 126 and may extend in the first direction DR1. The first connection portion copo1 may connect one end or an end of the first portion po1 and one end or an end of the second portion po2.

The second connection portion copo2 may extend in a direction opposite to the second direction DR2 from the first portion po1 and may be connected to the first control line CLA through a first contact hole cth1.

The fourth connection portion copo4 may extend in the direction opposite to the second direction DR2 from a second portion po2, may be connected to a third connection portion copo3 through a third contact hole cth3, and may be connected to the first output line D1 through a fourth contact hole cth4.

In an embodiment, the second conductive layer OR2 may include the first electrode portion po3, a second electrode portion po4, a third electrode portion po5, and the third connection portion copo3.

The first electrode portion po3 may overlap the active material layer 126 and extend in the second direction DR2. The first electrode portion po3 may form a first electrode s1 (for example, a source electrode) of the first transistor M1 and a first electrode s3 (a source electrode) of the third transistor M3. Although not shown, the first electrode portion po3 may be connected to the first doping region 126*a* of an active material layer 126 thereunder through a contact hole.

The second electrode portion po4 may overlap the active material layer 126 and extend in the second direction DR2. The second electrode portion po4 may form a first electrode s2 (a source electrode) of the second transistor M2 and a first electrode s4 (a source electrode) of the fourth transistor M4. Although not shown, the second electrode portion po4 may be connected to the first doping region 126*a* of the active material layer 126 thereunder through a contact hole.

The third electrode portion po5 overlaps the active material layer 126 and is disposed between the first electrode portion po3 and the second electrode portion po4. The third electrode portion po5 extends in the second direction DR2 and is connected to the first data line DL1 through a second contact hole cth2. Although not shown, the third electrode portion po5 may be connected to the second doping region 126*b* of the active material layer 126 thereunder through a contact hole. The third electrode portion po5 may form second electrodes dr1, dr2, dr3, and dr4 (or drain electrodes) of the first to fourth transistors M1, M2, M3, and M4.

The third connection portion copo3 may extend in the first direction DR1 and may connect one end or an end of the first electrode portion po3 and one end or an end of the second electrode portion po4.

The first control line CLA extends in the first direction DR1 and is connected to the second connection portion copo2 through the first contact hole cth1, and the first data line DL1 extends in the second direction DR2 and is connected to the third electrode portion po5 through the second contact hole cth2.

In an embodiment, the first conductive layer OR1 may further include the first data line DL1. The first data line DL1 may extend in the second direction DR2 and may be connected to the third electrode portion po5 through the second contact hole cth2.

In an embodiment, the second conductive layer OR2 may further include the first control line CLA and the first output line D1. The first control line CLA may extend in the first direction DR1 and may be connected to the second connection portion copo2 through the first contact hole cth1. The first output line D1 may extend in the first direction DR1 and may be connected to the fourth connection portion copo4 through the fourth contact hole cth4.

The second distribution unit 164 may be further formed by the active material layer 126, the first conductive layer OR1, and the second conductive layer OR2.

In an embodiment, the first conductive layer OR1 may further include a third portion po6, a fourth portion po7, a fifth connection portion copo5, a sixth connection portion copo6, and an eighth connection portion copo8.

The third portion po6 may overlap the active material layer 126 and may be provided in a form extending in the second direction DR2. The third portion po6 may include (form) a thirteenth gate electrode g13 and a fifteenth gate electrode g15.

The fourth portion po7 may overlap the active material layer 126, may be spaced apart from the third portion po6, and may extend in the second direction DR2. The fourth portion po7 may include a fourteenth gate electrode g14 and a sixteenth gate electrode g16.

The fifth connection portion copo5 may not overlap the active material layer 126 and may extend in the first direction DR1. The fifth connection portion copo5 may connect one end or an end of the third portion po6 and one end or an end of the fourth portion po7.

The sixth connection portion copo6 may extend in the direction opposite to the second direction DR2 from the third portion po6 and may be connected to the second control line CLB through a sixth contact hole cth6.

The eighth connection portion copo8 may extend in the direction opposite to the second direction DR2 from the fourth portion po7, may be connected to the seventh connection portion copo7 through a seventh contact hole cth7, and may be connected to the first output line D1 through an eighth contact hole cth8.

In an embodiment, the second conductive layer OR2 may further include a fifth electrode portion po8, a sixth electrode portion po9, a seventh electrode portion po10, and a seventh connection portion copo7.

The fifth electrode portion po8 may overlap the active material layer 126 and extend in the second direction DR2. The fifth electrode portion po8 may form a first electrode s13 (for example, a source electrode) of the thirteenth transistor M13 and a first electrode s15 (a source electrode) of the fifteenth transistor M15. Although not shown, the fifth electrode portion po8 may be connected to the first doping region 126*a* of the active material layer 126 thereunder through a contact hole.

The sixth electrode portion po9 may overlap the active material layer 126 and extend in the second direction DR2. The sixth electrode portion po9 may form a first electrode s14 (a source electrode) of the fourteenth transistor M14 and a first electrode s16 (a source electrode) of the sixteenth transistor M16. Although not shown, the sixth electrode portion po9 may be connected to the first doping region 126*a* of the active material layer 126 thereunder through a contact hole.

The seventh electrode portion po10 overlaps the active material layer 126 and is disposed between the fifth electrode portion po8 and the sixth electrode portion po9. The seventh electrode portion po10 extends in the second direction DR2 and is connected to the fourth data line DL4 through the fifth contact hole cth5. Although not shown, the seventh electrode portion po10 may be connected to the second doping region 126*b* of the active material layer 126 thereunder through a contact hole.

The seventh connection portion copo7 may extend in the first direction DR1 and may connect one end or an end of the fifth electrode portion po8 and one end or an end of the sixth electrode portion po9.

The second control line CLB extends in the first direction DR1 and is connected to the sixth connection portion copo6 through the sixth contact hole cth6, and the fourth data line DL4 extends in the second direction DR2 and is connected to the seventh electrode portion po10 through the fifth contact hole cth5.

In an embodiment, the first conductive layer OR1 may further include the fourth data line DL4. The fourth data line DL4 may extend in the second direction DR2 and may be connected to the seventh electrode portion po10 through the fifth contact hole cth5. The seventh electrode portion po10 may form the drain electrodes dr13, dr14, dr15, and dr16 of the thirteenth to sixteenth transistors M13, M14, M15, and M16.

The second distribution unit 164 may be further formed by the active material layer 126, the first conductive layer OR1, and the second conductive layer OR2.

In an embodiment, the second conductive layer OR2 may further include the second control line CLB and the first output line D1. The second control line CLB may extend in the first direction DR1 and may be connected to the sixth connection portion copo6 through the sixth contact hole cth6. The first output line D1 may extend in the first direction DR1 and may be connected to the eighth connection portion copo8 through the eighth contact hole cth8.

As described above, the display device according to an embodiment of the disclosure may include a transistor arrangement structure connected to each other in series/parallel in the demultiplexer. Therefore, a dead space may be reduced and a loss of a data signal may be improved according to the transistor series/parallel connection structure. Accordingly, image quality may be improved.

Figure 5A:
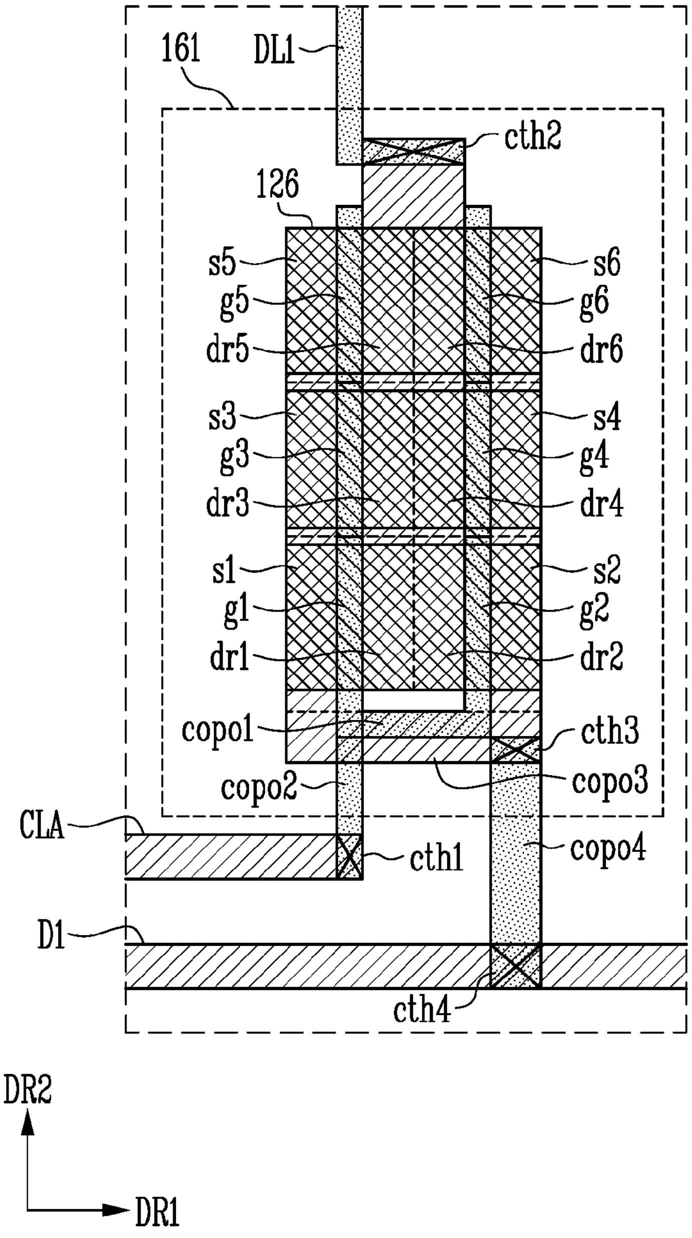
FIG. 5A is a schematic diagram illustrating an example of the layout of the demultiplexer of FIG. 2.
Figure 5B:
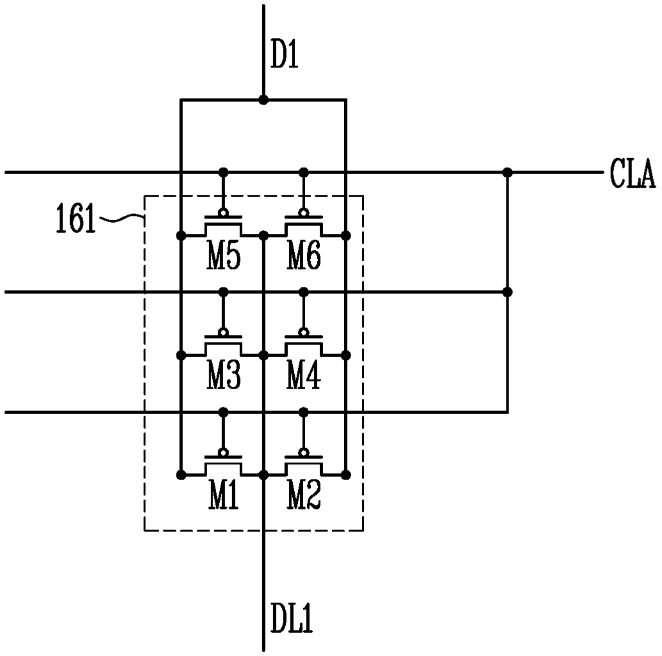
FIG. 5B is a schematic diagram illustrating an example of a transistor included in the demultiplexer of FIG. 5A.

FIG. 5A is a schematic diagram illustrating an example of the layout of the demultiplexer of FIG. 2. FIG. 5B is a schematic diagram illustrating an example of a transistor included in the demultiplexer of FIG. 5A.

Hereinafter, the first distribution unit 161 is described as an example with reference to FIGS. 5A and 5B. Since the second to sixth distribution units 164, 162, 165, 163, and 166 may be described identically to the first distribution unit 161, a repetitive description is omitted.

In FIGS. 5A and 5B, the same reference numerals are used for the configuration elements described with reference to FIGS. 2, 3, and 4, and a repetitive description of such configuration elements is omitted. The first distribution unit 161 of FIGS. 5A and 5B may have a configuration substantially the same as or similar to that of the first distribution unit of FIG. 4 except for a configuration of the fifth transistor M5 and the sixth transistor M6.

Referring to FIGS. 5A and 5B, the first distribution unit 161 may include the first to sixth transistors M1, M2, M3, M4, M5, and M6.

The fifth transistor M5 is connected with the third transistor M3 in parallel and may include a fifth gate electrode g5. The fifth transistor M5 is disposed in the second direction DR2 with respect to the third transistor M3.

The sixth transistor M6 is connected with the fifth transistor M5 in series, connected with the fourth transistor M4 in parallel, and may include a sixth gate electrode g6. The sixth transistor M6 is disposed in the second direction DR2 with respect to the fourth transistor M4 and is disposed in the first direction DR1 with respect to the fifth transistor M5.

The first conductive layer OR1 may include the first portion po1, the second portion po2, the first connection portion copo1, the second connection portion copo2, and the fourth connection portion copo4.

The first portion po1 may overlap the active material layer 126 and may be provided in a form extending in the second direction DR2. The first portion po1 may include (form) the first gate electrode g1, the third gate electrode g3, and the fifth gate electrode g5.

The second portion po2 may overlap the active material layer 126, may be spaced apart from the first portion po1, and may extend in the second direction DR2. The second portion po2 may include the second gate electrode g2, the fourth gate electrode g4, and the sixth gate electrode g6.

In an embodiment, the second conductive layer OR2 may include the first electrode portion po3, the second electrode portion po4, the third electrode portion po5, and the third connection portion copo3.

The first electrode portion po3 may overlap the active material layer 126 and may extend in the second direction DR2. The first electrode portion po3 may form the first electrode s1 (for example, the source electrode) of the first transistor M1, the first electrode s3 (source electrode) of the third transistor M3, and a first electrode s5 of the fifth transistor M5. Although not shown, the first electrode portion po3 may be connected to the first doping region 126*a* of the active material layer 126 thereunder through a contact hole.

The second electrode portion po4 may overlap the active material layer 126 and may extend in the second direction DR2. The second electrode portion po4 may form the first electrode s2 (source electrode) of the second transistor M2, the first electrode s4 (source electrode) of the fourth transistor M4, and a first electrode s6 of the sixth transistor M6. Although not shown, the second electrode portion po4 may be connected to the first doping region 126*a* of the active material layer 126 thereunder through a contact hole.

The third electrode portion po5 overlaps the active material layer 126 and is disposed between the first electrode portion po3 and the second electrode portion po4. The third electrode portion po5 extends in the second direction DR2 and is connected to the first data line DL1 through the second contact hole cth2. Although not shown, the third electrode portion po5 may be connected to the second doping region 126*b* of the active material layer 126 thereunder through a contact hole. The third electrode portion po5 may form second electrodes dr1, dr2, dr3, dr4, dr5, and dr6 (or drain electrodes) of the first to sixth transistors M1, M2, M3, M4, M5, and M6.

In an embodiment, in case that the first control signal is applied through the first control line CLA, the first control signal may be applied to the gate electrodes g1, g2, g3, g4, g5, and g6 of the first to sixth transistors M1, M2, M3, M4, M5, and M6. At this time, in case that the first control signal of a turn-on level is applied, the first to sixth transistors M1, M2, M3, M4, M5, and M6 may be turned on.

In case that the first data signal is applied through the first output line D1, the first data signal may be applied to the source electrodes s1, s2, s3, s4, s5, and s6 of the first to sixth transistors M1, M2, M3, M4, M5, and M6. At this time, the first data signal applied to the source electrodes s1, s2, s3, s4, s5, s6 of the first to sixth transistors M1, M2, M3, M4, M5, and M6 may be applied to the first data line DL1 through the drain electrodes dr1, dr2, dr3, dr4, dr5, and dr6 of the first to sixth transistors M1, M2, M3, M4, M5, and M6.

In the demultiplexer according to FIGS. 5A and 5B of the disclosure, the transistors provided in each of the demultiplexers may be arranged or disposed in three columns to improve data signal loss, thereby improving image quality.

Figure 6:
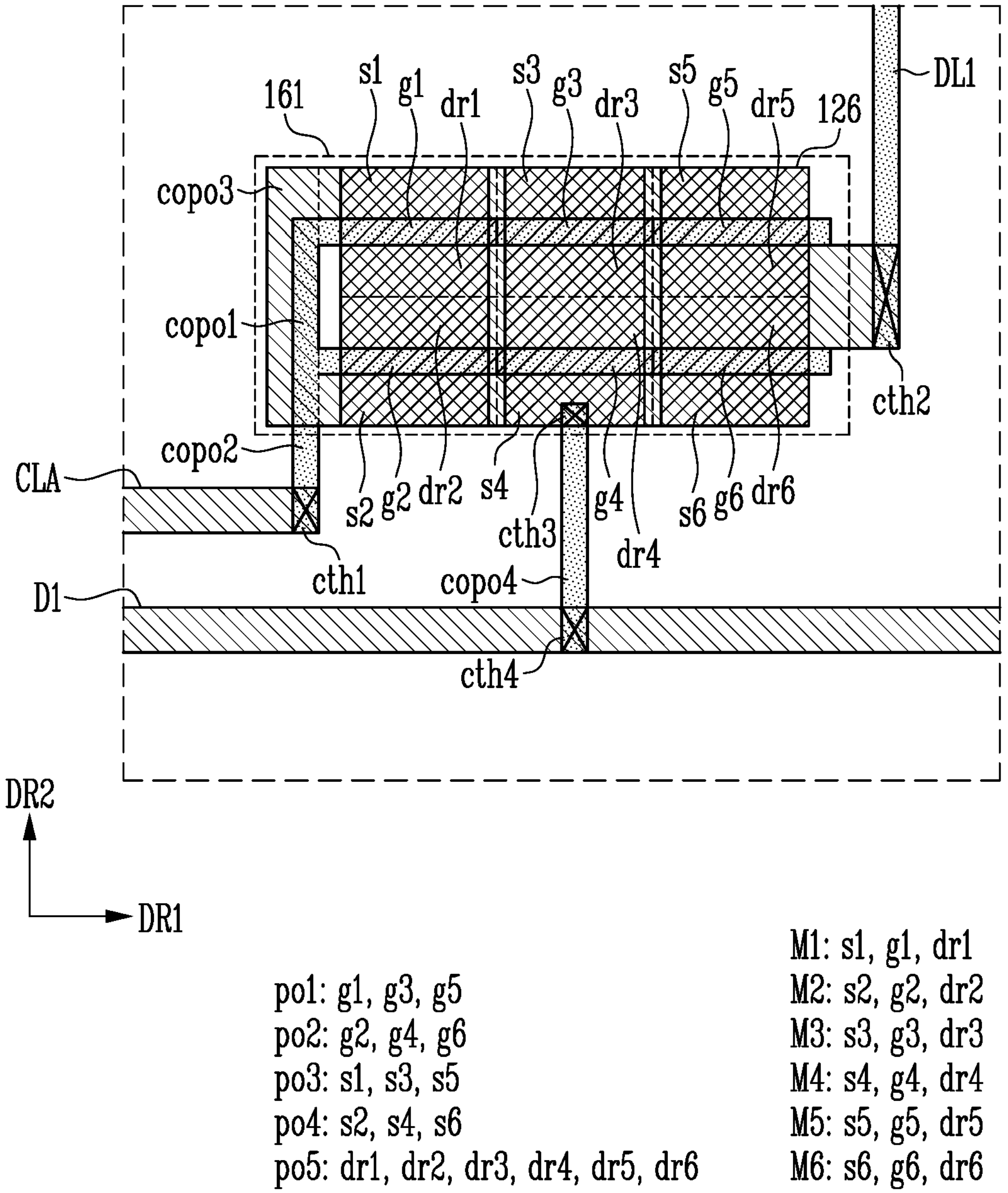
FIG. 6 is a schematic diagram illustrating an example of the layout of the demultiplexer of FIG. 2.

FIG. 6 is a schematic diagram illustrating an example of the layout of the demultiplexer of FIG. 2.

Hereinafter, the first distribution unit 161 is described as an example with reference to FIG. 6. Since the second to sixth distribution units 164, 162, 165, 163, and 166 may be described identically to the first distribution unit 161, a repetitive description is omitted. A description of the same portion as the demultiplexer described with reference to FIG. 5A is omitted.

In FIG. 6, the same reference numerals are used for the configuration elements described with reference to FIGS. 5A and 5B, and a repetitive description of such configuration elements is omitted. The first distribution unit 161 of FIG. 6 may have a configuration substantially the same as or similar to the first distribution unit of FIG. 5A.

Referring to FIG. 6, the first distribution unit 161 may include the first to sixth transistors M1, M2, M3, M4, M5, and M6.

The first conductive layer OR1 may include the first portion po1, the second portion po2, the first connection portion copo1, the second connection portion copo2, and the fourth connection portion copo4.

The first portion po1 may overlap the active material layer 126 and may be provided in a form extending in the first direction DR1. The first portion po1 may include (form) the first gate electrode g1, the third gate electrode g3, and the fifth gate electrode g5.

The second portion po2 may overlap the active material layer 126, may be spaced apart from the first portion po1, and may extend in the first direction DR1. The second portion po2 may include the second gate electrode g2, the fourth gate electrode g4, and the sixth gate electrode g6.

The gate electrodes g1, g3, and g5 of the first transistor M1, the third transistor M3, and the fifth transistor M5, and the gate electrodes g2, g4, and g6 of the second transistor M2, the fourth transistor M4, and the sixth transistor M6 may be symmetrical with respect to the first direction DR1.

In an embodiment, the second conductive layer OR2 may include the first electrode portion po3, the second electrode portion po4, the third electrode portion po5, and the third connection portion copo3.

The first electrode portion po3 may overlap the active material layer 126 and extend in the first direction DR1. The first electrode portion po3 may form the first electrode s1 (for example, the source electrode) of the first transistor M1, the first electrode s3 (source electrode) of the third transistor M3, and the first electrode s5 of the fifth transistor M5. Although not shown, the first electrode portion po3 may be connected to the first doping region 126*a* of the active material layer 126 thereunder through a contact hole.

The second electrode portion po4 may overlap the active material layer 126 and may extend in the first direction DR1. The second electrode portion po4 may form the first electrode s2 (source electrode) of the second transistor M2, the first electrode s4 (source electrode) of the fourth transistor M4, and the first electrode s6 of the sixth transistor M6. Although not shown, the second electrode portion po4 may be connected to the first doping region 126*a* of the active material layer 126 thereunder through a contact hole.

The third electrode portion po5 overlaps the active material layer 126 and is disposed between the first electrode portion po3 and the second electrode portion po4. The third electrode portion po5 extends in the first direction DR1 and is connected to the first data line DL1 through the second contact hole cth2. Although not shown, the third electrode portion po5 may be connected to the second doping region 126*b* of the active material layer 126 thereunder through a contact hole. The third electrode portion po5 may form the second electrodes dr1, dr2, dr3, dr4, dr5, and dr6 (or the drain electrodes) of the first to sixth transistors M1, M2, M3, M4, M5, and M6.

According to the embodiment of FIG. 6 of the disclosure, compared to the demultiplexer according to the embodiment of FIG. 5A, the transistors provided in the demultiplexer may have a form rotated by about 90 degrees. Therefore, the demultiplexer may be integrated by reducing the dead space (or the bezel) in the second direction DR2 of the display panel PNL.

Figure 7A:
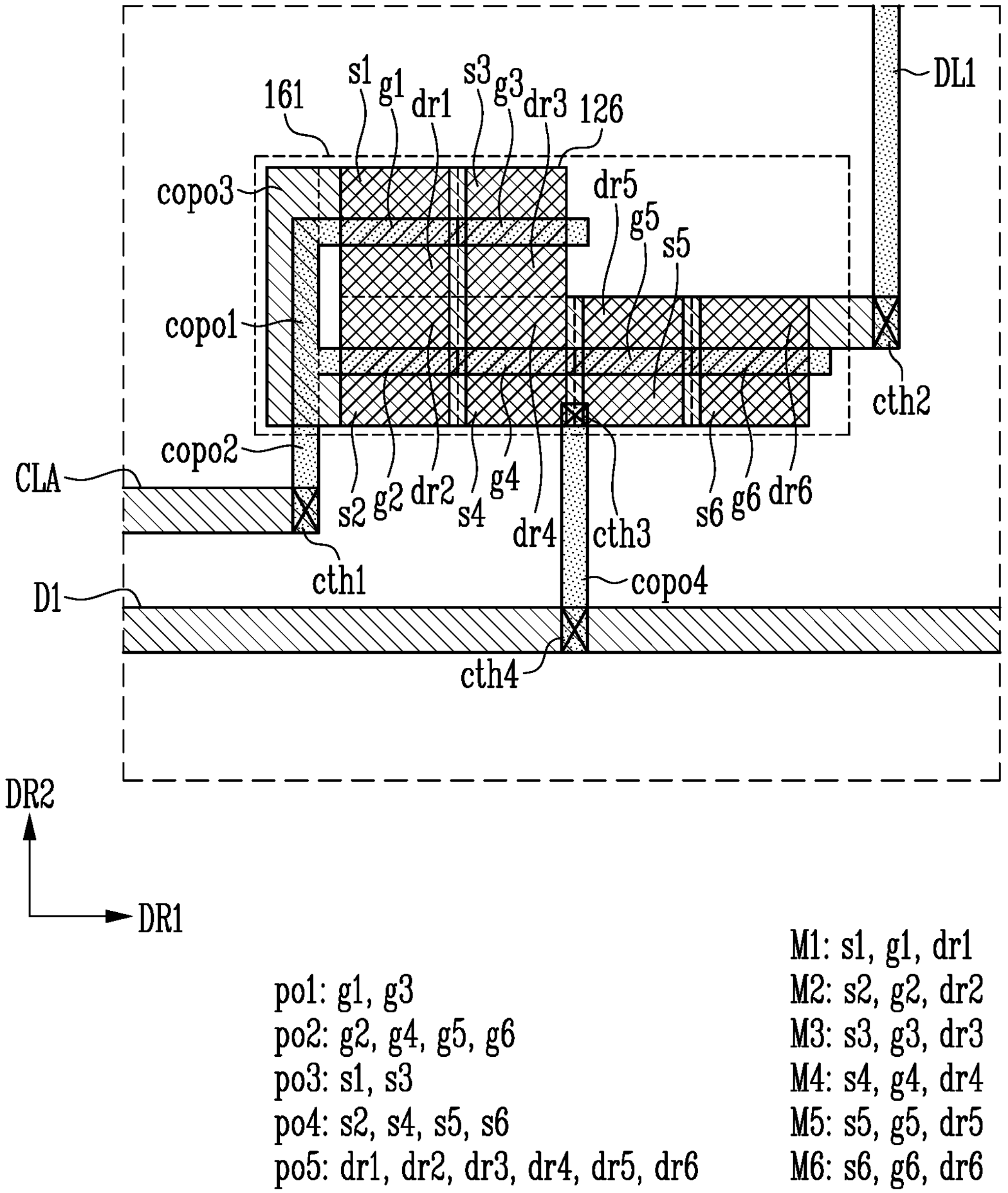
FIG. 7A is a schematic diagram illustrating an example of the layout of the demultiplexer of FIG. 2.
Figure 7B:
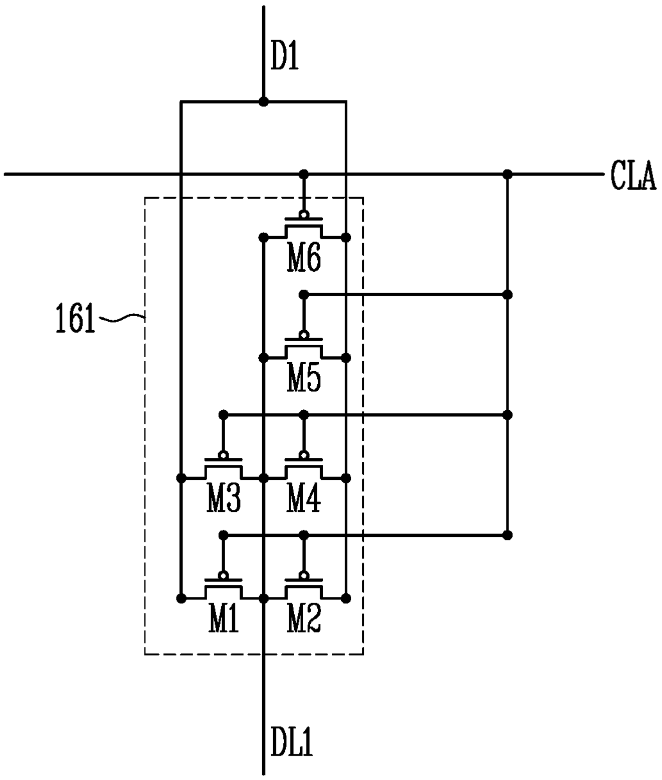
FIG. 7B is a schematic diagram illustrating an example of the transistor included in the demultiplexer.

FIG. 7A is a schematic diagram illustrating an example of the layout of the demultiplexer of FIG. 2. FIG. 7B is a schematic diagram illustrating an example of the transistor included in the demultiplexer.

Hereinafter, the first distribution unit 161 is described as an example with reference to FIGS. 7A and 7B. Since the second to sixth distribution units 164, 162, 165, 163, and 166 may be described identically to the first distribution unit 161, a repetitive description is omitted.

In FIGS. 7A and 7B, the same reference numerals are used for the configuration elements described with reference to FIGS. 2, 3, 4, 5A, and 5B, and a repetitive description of such configuration elements is omitted.

Referring to FIGS. 7A and 7B, the first distribution unit 161 may include the first to sixth transistors M1, M2, M3, M4, M5, and M6.

The fifth transistor M5 is connected with the fourth transistor M4 in parallel and may include the fifth gate electrode g5. The fifth transistor M5 is disposed in the first direction DR1 with respect to the fourth transistor M4.

The sixth transistor M6 is connected with the fifth transistor M5 in series and may include the sixth gate electrode g6. The sixth transistor M6 is disposed in the first direction DR1 with respect to the fifth transistor M5.

The first conductive layer OR1 may include the first portion po1, the second portion po2, the first connection portion copo1, the second connection portion copo2, and the fourth connection portion copo4.

The first portion po1 may overlap the active material layer 126 and may be provided in a form extending in the first direction DR1. The first portion po1 may include (form) the first gate electrode g1 and the third gate electrode g3.

The second portion po2 may overlap the active material layer 126, may be spaced apart from the first portion po1, and may extend in the first direction DR1. The second portion po2 may include the second gate electrode g2, the fourth gate electrode g4, the fifth gate electrode g5, and the sixth gate electrode g6.

In an embodiment, the second conductive layer OR2 may include the first electrode portion po3, the second electrode portion po4, the third electrode portion po5, and the third connection portion copo3.

The first electrode portion po3 may overlap the active material layer 126 and extend in the first direction DR1. The first electrode portion po3 may form the first electrode s1 (for example, the source electrode) of the first transistor M1 and the first electrode s3 (source electrode) of the third transistor M3. Although not shown, the first electrode portion po3 may be connected to the first doping region 126*a* of the active material layer 126 thereunder through a contact hole.

The second electrode portion po4 may overlap the active material layer 126 and extend in the first direction DR1. The second electrode portion po4 may form the first electrode s2 (source electrode) of the second transistor M2, the first electrode s4 (source electrode) of the fourth transistor M4, the first electrode s5 (source electrode) of the fifth transistor M5, and the first electrode s6 (source electrode) of the sixth transistor M6. Although not shown, the second electrode portion po4 may be connected to the first doping region 126*a* of the active material layer 126 thereunder through a contact hole.

The third electrode portion po5 overlaps the active material layer 126 and is disposed between the first electrode portion po3 and the second electrode portion po4. The third electrode portion po5 extends in the first direction DR1 and is connected to the first data line DL1 through the second contact hole cth2. Although not shown, the third electrode portion po5 may be connected to the second doping region 126*b* of the active material layer 126 thereunder through a contact hole. The third electrode portion po5 may form the second electrodes dr1, dr2, dr3, dr4, dr5, and dr6 (or the drain electrodes) of the first to sixth transistors M1, M2, M3, M4, M5, and M6.

In an embodiment, in case that the first control signal is applied through the first control line CLA, the first control signal may be applied to the gate electrodes g1, g2, g3, g4, g5, and g6 of the first to sixth transistors M1, M2, M3, M4, M5, and M6. At this time, in case that the first control signal of the turn-on level is applied, the first to sixth transistors M1, M2, M3, M4, M5, and M6 may be turned on.

In case that the first data signal is applied through the first output line D1, the first data signal may be applied to the source electrodes s1, s2, s3, s4, s5, and s6 of the first to sixth transistors M1, M2, M3, M4, M5, and M6. At this time, the first data signal applied to the source electrodes s1, s2, s3, s4, s5, s6 of the first to sixth transistors M1, M2, M3, M4, M5, M6 may be applied to the first data line DL1 through the drain electrodes dr1, dr2, dr3, dr4, dr5, and dr6 of the first to sixth transistors M1, M2, M3, M4, M5, and M6.

According to the embodiment of FIGS. 7A and 7B of the disclosure, compared to the embodiment of FIG. 6, the first distribution unit 161 may have a form in which the gate electrodes g1 and g3 of the first transistor M1 and the third transistor M3 and the gate electrodes g2, g4, g5, and g6 of the second transistor M2, the fourth transistor M4, the fifth transistor M5, and the sixth transistor M6 are asymmetrical with respect to the first direction DR1. Therefore, the demultiplexer may be integrated by reducing the dead space (or the bezel) in the second direction DR2 of the display panel PNL.

Figure 8:
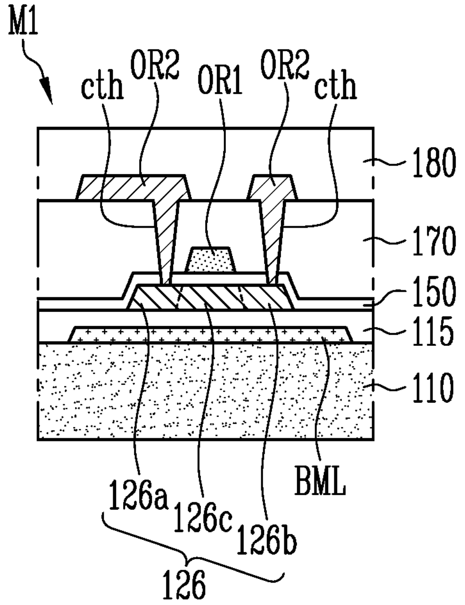
FIG. 8 is a schematic cross-sectional view illustrating an example of a first transistor included in the demultiplexer of FIG. 2.
Figure 9:
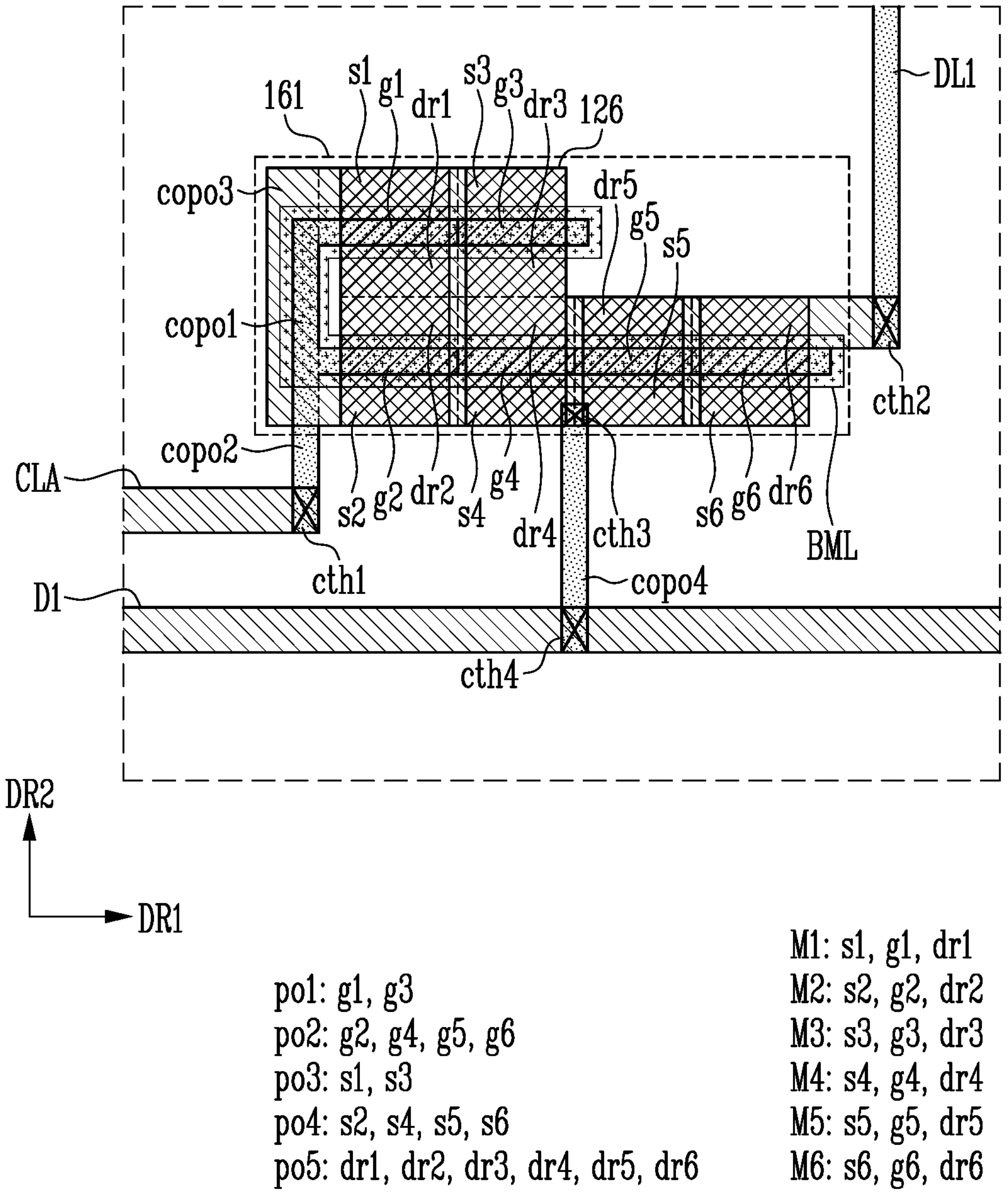
FIG. 9 is a schematic diagram illustrating an example of a layout of the demultiplexer including the first transistor of FIG. 8.

FIG. 8 is a schematic cross-sectional view illustrating an example of the first transistor included in the demultiplexer of FIG. 2. FIG. 9 is a schematic diagram illustrating an example of a layout of the demultiplexer including the first transistor of FIG. 8. Hereinafter, a description repetitive to that of FIG. 3 is omitted.

Hereinafter, in FIG. 8, the first transistor M1 is described as an example, but the configuration of the second to twenty-fourth transistors M2, M3, M4, M5, M6, M7, M8, M9, M10, M11, M12, M13, M14, M15, M16, M17, M18, M19, M20, M21, M22, M23, and M24 is substantially the same as the structure of the first transistor M1, and thus a repetitive description is omitted. For convenience of description, not all configurations of the substrate of the first transistor M1 are shown in FIG. 8, but only some configurations are shown.

Referring to FIG. 8, the display panel PNL including the first transistor M1 may include the base substrate 110, the buffer layer 115, the active material layer 126, the gate insulating layer 150, the first conductive layer OR1, the second conductive layer OR2, and a light blocking layer BML.

In an embodiment, the light blocking layer BML may be disposed on the base substrate 110. Each light blocking layer BML is disposed to overlap the active material layer 126 of the first transistor M1. The light blocking layer BML may include a material that blocks light to prevent light from entering the active material layer 126. For example, the light blocking layer BML may be formed of an opaque metal material that blocks light transmission.

The buffer layer 115 is disposed on the light blocking layer BML and the base substrate 110. The buffer layer 115 may be disposed to cover or overlap the base substrate 110 entirely by covering the light blocking layer BML. The semiconductor layer is disposed on the buffer layer 115.

The active material layer 126 may be disposed on the buffer layer 115.

The demultiplexer according to the embodiment of FIG. 8 is different from the demultiplexer of FIG. 3 in that the light blocking layer BML may be disposed between the base substrate 110 and the buffer layer 115.

A description of the first distribution unit 161 according to the embodiment of FIG. 9 is the same as the first distribution unit 161 of the embodiment of FIG. 7A except that the light blocking layer BML, may be additionally included.

Figure 10:
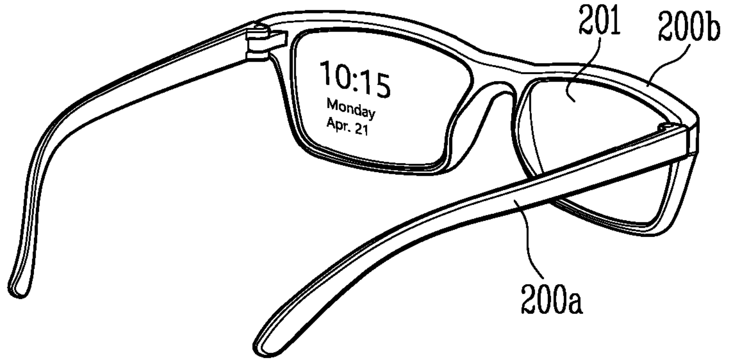
FIG. 10 is a schematic diagram illustrating a smart glass in which a display device according to an embodiment is provided.

FIG. 10 is a schematic diagram illustrating a smart glass in which a display device according to an embodiment of the disclosure is provided.

Referring to FIG. 10, the display device 1 according to an embodiment may be applied to a smart glass including a frame 200 and a lens portion 201. The smart glass may be a wearable electronic device that may be worn on a face of a user, and may be a structure in which a portion of the frame 200 is folded or unfolded. For example, the smart glass may be a wearable device for augmented reality (AR).

The frame 200 may include a housing 200*b* supporting the lens portion 201 and a leg portion 200*a* for wearing by the user. The leg portion 200*a* may be connected to the housing 200*b* by a hinge and may be folded or unfolded.

The frame 200 may include a battery, a touch pad, a microphone, a camera, and the like therein. The frame 200 may include a projector that outputs light, a processor that controls a light signal or the like, and the like therein.

The lens portion 201 may be an optical member that transmits light or reflects light. The lens portion 201 may include glass, transparent synthetic resin, or the like within the spirit and the scope of the disclosure.

The lens portion 201 may reflect an image by a light signal transmitted from the projector of the frame 200 by a rear surface (for example, a surface of a direction facing an eye of the user) of the lens portion 201 to allow the eye of the user to recognize. For example, as shown in the drawing, the user may recognize information such as time and date displayed on the lens portion 201. The lens portion 201 may be one type of a display device, and in the above-described embodiment, the display device may be applied to the lens portion 201.

Figure 11:
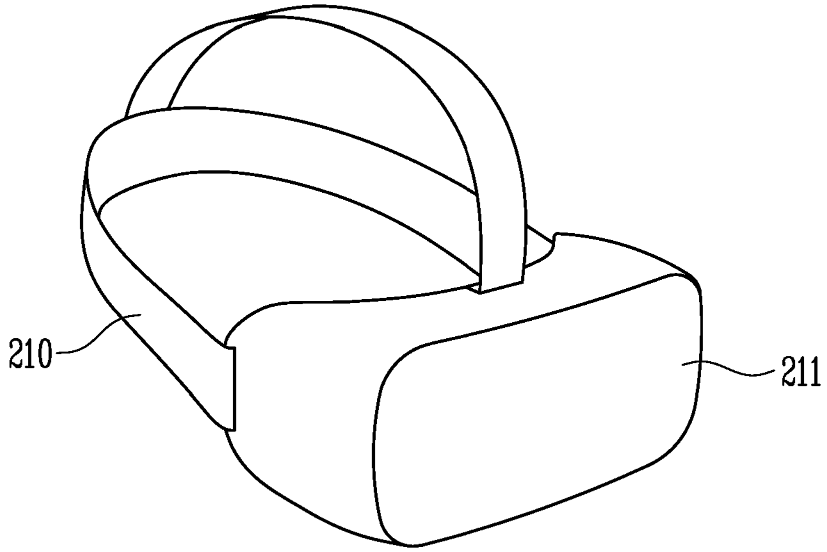
FIG. 11 is a schematic diagram illustrating a head mounted display in which a display device according to an embodiment is provided.

FIG. 11 is a schematic diagram illustrating a head mounted display in which a display device according to an embodiment of the disclosure is provided.

Referring to FIG. 11, the display device 1 according to an embodiment may be applied to a head mounted display (HMD) including a head mounting band 210 and a display storage case 211. The HMD is a wearable electronic device that may be worn on a head of a user.

The head mounting band 210 is a portion connected to the display storage case 211 and fixing the display storage case 211. In the drawing, the head mounting band 210 is shown to surround an upper surface and both side surfaces of the head of the user, but the disclosure is not limited thereto. The head mounting band 210 may be for fixing the HMD to the head of the user, and may be formed in an eyeglass frame form or a helmet form.

The display storage case 211 may accommodate the display device and may include at least one lens. The at least one lens is a portion that provides an image to the user. For example, the display device 1 may be applied to a left-eye lens and a right-eye lens implemented in the display storage case 211 in an embodiment.

Figure 12:
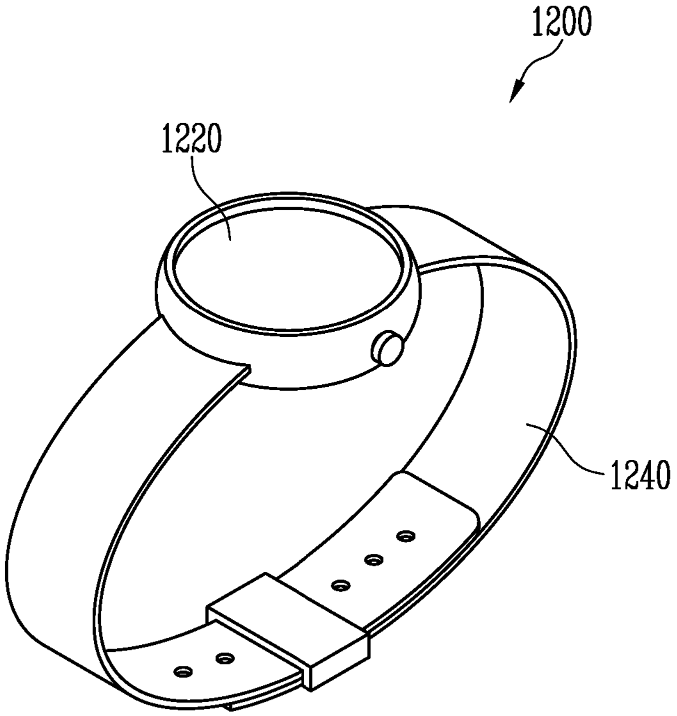
FIG. 12 is a schematic diagram illustrating a smart watch in which a display device according to an embodiment is provided.

FIG. 12 is a schematic diagram illustrating a smart watch in which a display device according to an embodiment of the disclosure is provided.

In an embodiment of the disclosure, the display device 1 may be applied to the smart watch 1200 including a display portion 1220 and a strap portion 1240.

The smart watch 1200 may be a wearable electronic device and may have a structure in which the strap portion 1240 is mounted on a wrist of a user. Here, the display device according to the embodiment may be applied to the display portion 1220, and thus image data including time information may be provided to the user.

Figure 13:
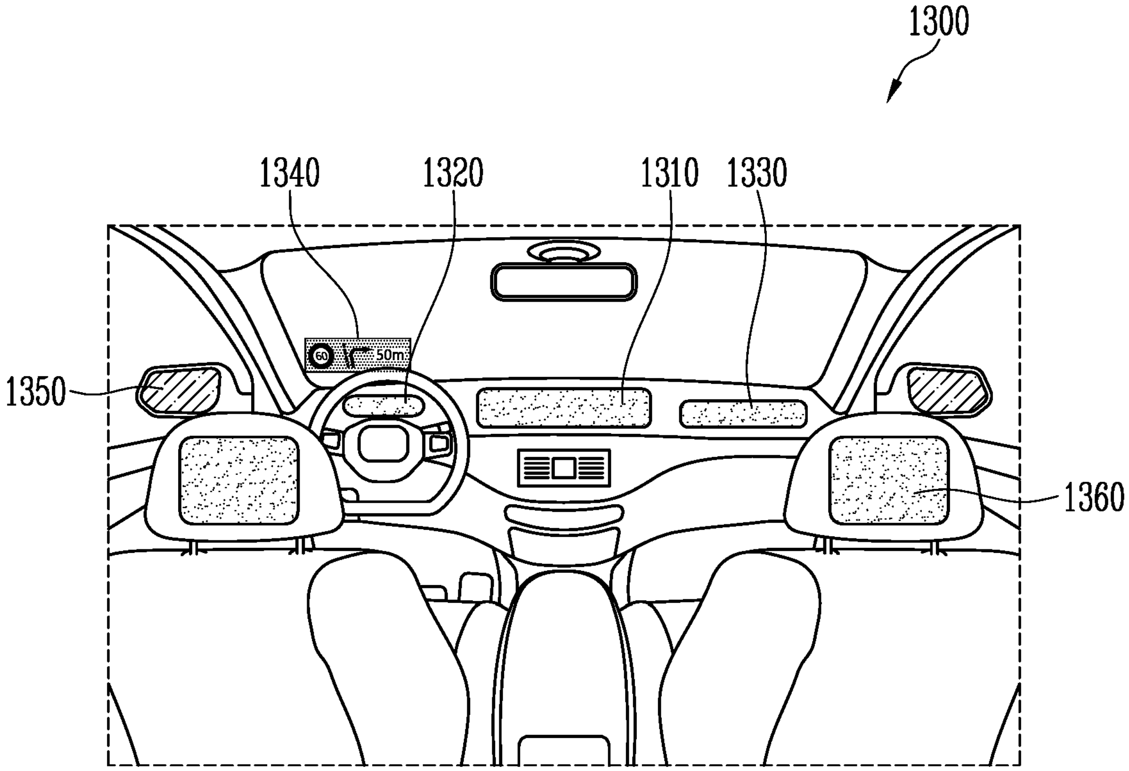
FIG. 13 is a schematic diagram illustrating an automotive display in which a display device according to an embodiment is provided.

FIG. 13 is a schematic diagram illustrating an automotive display in which a display device according to an embodiment of the disclosure is provided.

The display device 1 according to the embodiment of the disclosure may be applied to the automotive display 1300. Here, the automotive display 1300 may mean an electronic device provided inside and outside a vehicle to provide image data.

According to an example, the display device 1 may be applied to at least one of an infotainment panel 1310, a cluster 1320, a co-driver display 1330, a head-up display 1340, a side mirror display 1350, and a rear seat display 1360, which are provided in the vehicle.

Although embodiments have been described with reference to the accompanying drawings above, those of ordinary skill in the art to which the embodiments belongs will understand that embodiments may be implemented in other forms within the spirit and the scope of the disclosure. Therefore, it should be understood that the embodiments described above are illustrative and not limiting in all respects.

What is claimed is:

1. A display device comprising a display panel comprising:

a data driver that converts input data into a data signal and supplies the data signal to an output line;

a pixel unit including a plurality of pixels that display an image based on the data signal;

a demultiplexer including a plurality of transistors electrically connected to the output line in the display panel, and transmitting the data signal from the output line to data lines electrically connected to the plurality of pixels; and a timing controller that supplies control signals to control a supply timing of the data signal, wherein the plurality of transistors include a first transistor, a second transistor, a third transistor, and a fourth transistor, the first transistor and the second transistor are electrically connected in parallel, the third transistor and the fourth transistor are electrically connected in parallel, the first transistor and the third transistor are electrically connected in parallel, the second transistor and the fourth transistor are electrically connected in parallel, and the first transistor, the second transistor, the third transistor, and the fourth transistor are electrically connected between the output line and a data line among the data lines, wherein the demultiplexer comprises a first distributor that outputs the data signal to a first data line in response to a first control signal supplied to a first control line, wherein the first distributor comprises:

the first transistor including a first gate electrode;

the second transistor including a second gate electrode and disposed in a first direction with respect to the first transistor;

the third transistor including a third gate electrode and disposed in a second direction intersecting the first direction with respect to the first transistor; and the fourth transistor including a fourth gate electrode and disposed in the first direction with respect to the third transistor, wherein the display panel comprises:

an active layer disposed on a base substrate, the active layer including a channel region;

a gate insulating layer disposed on the active layer; and a first conductive layer disposed on the gate insulating layer, and wherein the first conductive layer comprises:

a first portion overlapping the active layer, extending in the second direction, and forming the first gate electrode and the third gate electrode;

a second portion overlapping the active layer, spaced apart from the first portion, extending in the second direction, and forming the second gate electrode and the fourth gate electrode; and a first connection portion that does not overlap the active layer, and electrically connecting an end of the first portion and an end of the second portion of the first conductive layer.

2. The display device according to claim 1, wherein the demultiplexer further comprises:

a second distributor that outputs the data signal to a second data line in response to a second control signal supplied to a second control line.

3. The display device according to claim 2, wherein the second distributor comprises:

a fifth transistor including a fifth gate electrode;

a sixth transistor electrically connected to the fifth transistor in parallel, the sixth transistor including a sixth gate electrode;

a seventh transistor electrically connected to the fifth transistor in parallel, the seventh transistor including a seventh gate electrode; and an eighth transistor electrically connected to the seventh transistor in parallel, the eighth transistor electrically connected to the sixth transistor in parallel, the eighth transistor including an eighth gate electrode, and the fifth gate electrode, the sixth gate electrode, the seventh gate electrode, and the eighth gate electrode are electrically connected to the second control line.

4. The display device according to claim 1, wherein the first gate electrode, the second gate electrode, the third gate electrode, and the fourth gate electrode are electrically connected to the first control line.

5. The display device according to claim 1, wherein the display panel further comprises:

an interlayer insulating layer disposed on the gate insulating layer, the interlayer insulating layer overlapping the first conductive layer; and a second conductive layer disposed on the interlayer insulating layer, the second conductive layer electrically contacting the active layer through contact holes.

6. The display device according to claim 5, wherein the second conductive layer comprises:

a first electrode portion overlapping the active layer, extending in the second direction, and forming a first electrode of the first transistor and a first electrode of the third transistor;

a second electrode portion overlapping the active layer, spaced apart from the first electrode portion, extending in the second direction, and forming a first electrode of the second transistor and a first electrode of the fourth transistor;

a third electrode portion disposed between the first electrode portion and the second electrode portion, extending in the second direction, and electrically connected to the first data line through a second contact hole; and a third connection portion electrically connecting an end of the first electrode portion and an end of the second electrode portion.

7. The display device according to claim 6, wherein the third electrode portion forms a second electrode of each of the first transistor, the second transistor, the third transistor, and the fourth transistor.

8. The display device according to claim 6, wherein the first conductive layer further comprises a fourth connection portion electrically connected to the third connection portion through a third contact hole, extending in a direction opposite to the second direction, and electrically connected to the output line through a fourth contact hole.

9. The display device according to claim 8, wherein the second conductive layer forms the first control line extending in the first direction and electrically connected to a second connection portion of the first conductive layer through a first contact hole, and the second conductive layer forms the output line extending in the first direction.

10. The display device according to claim 5, wherein the display panel further comprises:

a light blocking layer disposed on the base substrate; and a buffer layer overlapping the base substrate and disposed between the base substrate and the active layer.

11. The display device according to claim 10, wherein the light blocking layer overlaps the first conductive layer in a region overlapping the active layer.

12. The display device according to claim 11, wherein the light blocking layer overlaps the second conductive layer in a region that does not overlap the active layer.

13. The display device according to claim 1, wherein the first conductive layer comprises a second connection portion extending in a direction opposite to the second direction from the first portion and electrically connected to the first control line through a first contact hole.

14. The display device according to claim 1, wherein the first distributor further comprises:

a fifth transistor electrically connected to the third transistor in parallel, the fifth transistor including a fifth gate electrode; and a sixth transistor electrically connected to the fifth transistor in parallel, the sixth transistor electrically connected to the fourth transistor in parallel, the sixth transistor including a sixth gate electrode, and the fifth gate electrode and the sixth gate electrode are electrically connected to the first control line, each of the first to sixth transistors including the active layer that includes the channel region disposed between a source region and a drain region, the active layers of the first through sixth transistors being contiguous.

15. The display device according to claim 14, wherein the sixth transistor is disposed in the first direction with respect to the fifth transistor, and the fifth transistor is disposed in the second direction intersecting the first direction with respect to the third transistor.

16. The display device according to claim 14, wherein the fifth transistor is disposed in the first direction with respect to the third transistor, and the sixth transistor is disposed in a direction opposite to the second direction with respect to the fifth transistor.

17. The display device according to claim 1, wherein the first distributor further comprises:

a fifth transistor electrically connected to the fourth transistor in parallel, the fifth transistor including a fifth gate electrode; and a sixth transistor electrically connected to the fifth transistor in parallel, the sixth transistor including a sixth gate electrode, and the first gate electrode, the second gate electrode, the third gate electrode, the fourth gate electrode, the fifth gate electrode, and the sixth gate electrode, are electrically connected to the first control line.

18. The display device according to claim 17, wherein the fifth transistor is disposed in the first direction with respect to the fourth transistor, and the sixth transistor is disposed in the first direction with respect to the fifth transistor.

19. The display device according to claim 1, wherein each of the first to fourth transistors includes the active layer that includes the channel region disposed between a source region and a drain region, the active layers of the first through fourth transistors being contiguous.

* * * * *